Jan. 31, 1956     L. T. CARAPELLOTTI     2,733,358
VOLTAGE AMPLITUDE QUANTIZER AND CODER

Filed April 2, 1953     2 Sheets-Sheet 1

INVENTOR
LAWRENCE T. CARAPELLOTTI

BY
ATTORNEYS

United States Patent Office 2,733,358
Patented Jan. 31, 1956

2,733,358
VOLTAGE AMPLITUDE QUANTIZER AND CODER

Lawrence T. Carapellotti, Philadelphia, Pa., assignor, by mesne assignments, to the United States of America as represented by the Secretary of the Navy Application April 2, 1953, Serial No. 346,477

12 Claims. (Cl. 250—217)

This invention relates to a system and apparatus for measuring the voltage amplitude of an electric signal.

Briefly, the proposed apparatus comprises a cathode ray tube, a mask having aligned openings or slots provided therein and positioned over the face of the cathode ray tube, and a photocell pick-up arranged to receive the light impulses from the cathode ray tube through the slots in the mask. The signal to be measured is imposed in rectangular form on the cathode ray tube in such a manner as to deflect the beam of the tube by an amount proportional to the amplitude of the signal. At the time the beam reaches its full deflection, a sawtooth wave is applied to drive the beam at a uniform rate back towards its zero signal position. As the returning beam crosses the open slots in the mask at the various levels toward zero, it causes pulses of current to flow through the photocell. It is seen that the number of pulses flowing through the photocell is the quantized level of the voltage amplitude of the signal measured. The series of pulses through the photocell may be counted by a series of flip flop stages giving the quantized level in binary form.

It is, therefore, an object of this invention to deliver at some point a quantized voltage amplitude in coded form.

It is another object of this invention to provide a system for measuring the amplitude of a signal by converting the amplitude of the signal to determinate pulses of light which may be counted.

It is a still further object of this invention to provide a system for measuring the voltage amplitude of a signal by deflecting the beam of a cathode ray tube across the face of a slotted mask to obtain pulses of light which may be counted by a photocell and a computer.

Still another object of this invention is to provide an apparatus and system for measuring the voltage amplitude of a signal by means of a masked cathode ray tube, which will be inexpensive, simple and easily adjusted.

The invention will be further illustrated by the following description in conjunction with the accompanying drawings in which.

Figure 1:
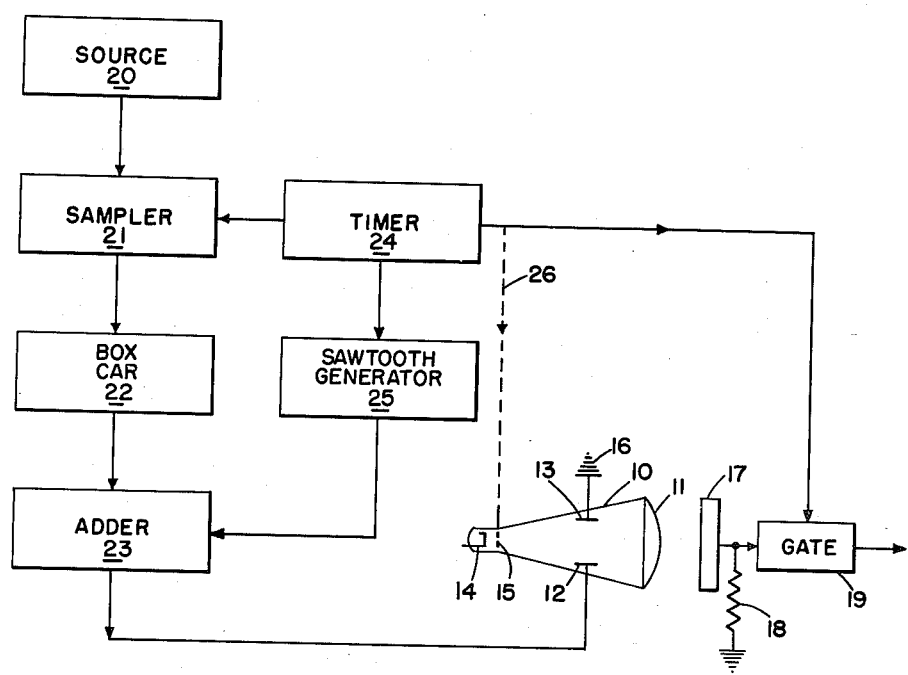
Figure 1 represents a simplified system, in block diagram form, for performing the operation of this invention.
Figure 2:
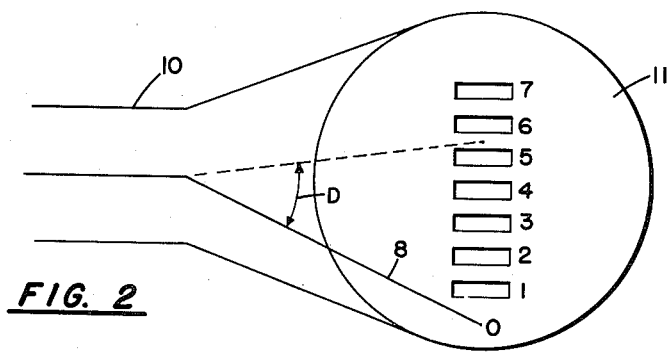
Figure 2 is a diagrammatical representation of the cathode ray tube with a slotted mask mounted on the face thereof.

Referring now particularly to Figures 1 and 2 of the drawings, 10 denotes a conventional cathode ray tube having a cathode 14, a grid 15, and vertical deflecting plates 12 and 13. Mounted in any suitable manner on the face of the tube 10 is a slotted mask 11. In the mask shown in Figure 2, seven slots, labeled 1–7 have been provided. It is to be understood, however, that any number of slots may be used. The entire mask 11 is opaque, except for the slots 1–7 which are translucent.

Figure 3:
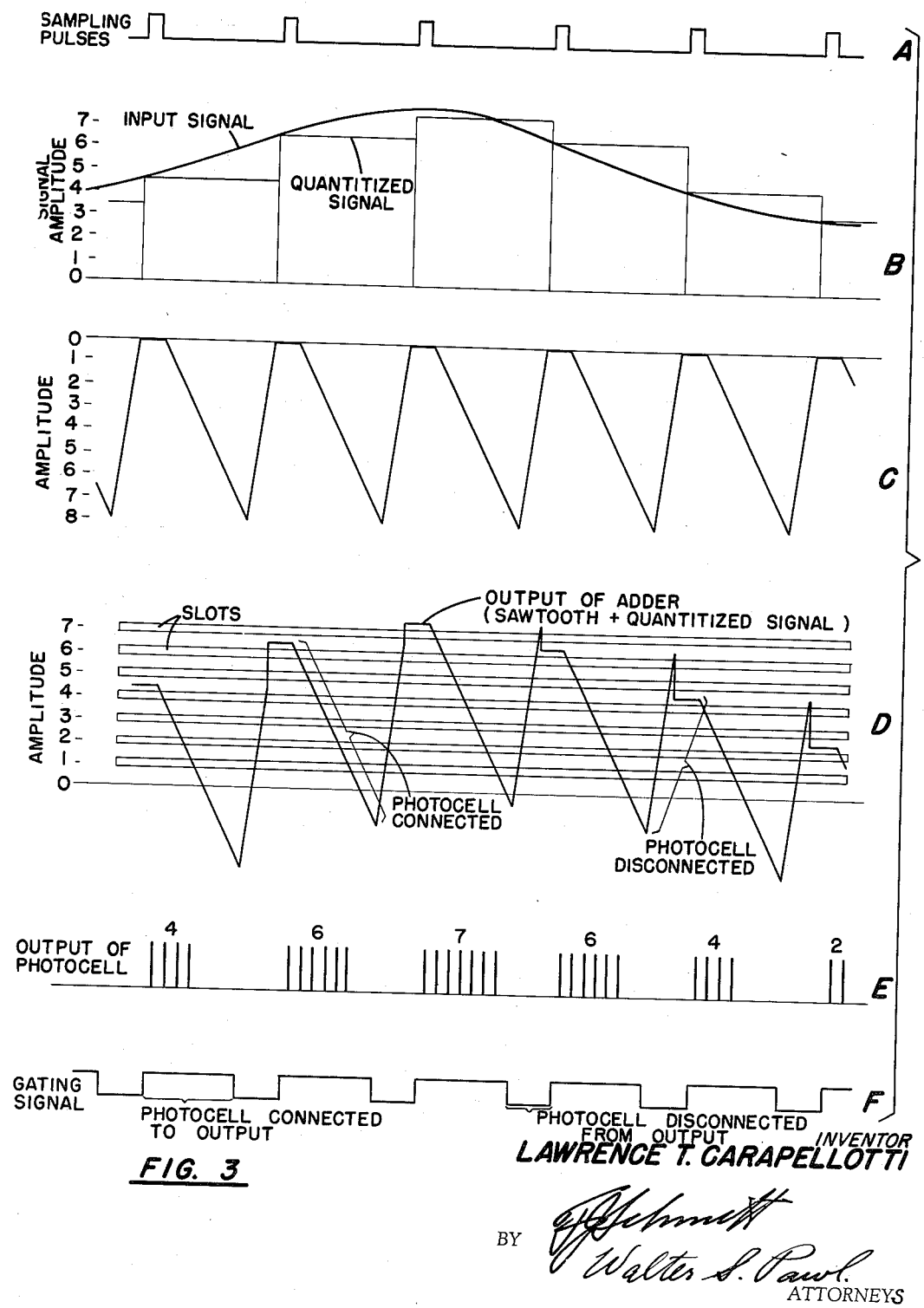
Figure 3 represents a series of wave forms which are employed in a typical embodiment of the system of Figure 1.

The block 20 labeled "source" represents the source of signals to be quantized and coded. The signal from the source may be the slowly varying signal labeled "input signal" as shown in Figure 3B. The quantizer and coder circuit will operate, however, only in response to flat-topped pulses or rectangular waves having a certain minimum time duration determined by the time required to sweep the cathode ray beam 8 across the coding slots after initial deflection D of the beam by the input signal. It is necessary, therefore, to convert the slowly varying input signal of Figure 3B into rectangular wave form. This is done by applying the input signal to a conventional sampling circuit 21 which is energized by a series of short equally spaced control pulse signals supplied by a timer circuit 24, as shown in Figure 1. The pulses supplied by the timer circuit 24 to the sampling circuit 21 are shown in Figure 3A. The output of the sampler is not shown in Figure 3, but the output has the form of pulses having a time duration approximately equal to that of the control pulses from the timer 24 and amplitudes equal to the instantaneous amplitude of the input signal at the times of occurrence of the control pulses. The output of the sampler 21 is applied to a conventional boxcar circuit 22 which stretches the sample pulses over the interval between successive pulses. The sampler circuit and the boxcar circuit may be combined into a single circuit for performing the two functions simultaneously, if desired.

The timer 24 also controls the operation of the sawtooth generator 25 which provides an output signal having the waveshape shown in Figure 3C. The amplitude of the sawtooth wave is at least equal to the maximum amplitude of the timing pulses. This amplitude limitation is imposed by the fact that the sawtooth wave must return the cathode ray beam to zero position, shown in Figure 2, after each deflection of the beam by the signal to be coded. The output of the sawtooth generator 25 does not start to fall until a small interval after the termination of the sample pulse in order that time may be allowed for the cathode ray beam 8 to be deflected and reach a quiescent condition under the influence of the quantized signal supplied from the boxcar circuit. The rate at which the sawtooth voltage output drops will determine the spacing between the pulses in the coded output. As will be explained below, the constants of the phosphor screen of the cathode ray tube 10 place a definite limitation on this rate.

The signal from the boxcar circuit 22 and the sawtooth generator circuit 25 are combined in a linear adding circuit 23, labeled "adder" in Figure 1, to produce the waveform shown in Figure 3D. Figure 3D is a plot of vertical deflection voltage of the cathode ray tube versus time. Since the deflection of the cathode ray tube is proportional to this deflection voltage, horizontal lines 1–7 representing the limits of the slots 1–7 in the mask may be added to Figure 3D to show the times at which the electron beam is in register with the slots 1–7. As shown in Figure 3D the electron beam 8 is first deflected upwardly by the quantized signal to a position intermediate slots 4 and 5. A short time interval later it is deflected downwardly by the addition of the sawtooth waveform so that it passes in succession over slots 4, 3, 2 and 1. As the cathode ray beam passes over each of the slots, a short burst of light will strike the photocell 17. This burst of light will cause a voltage pulse to appear at the photocell output. The four pulses in the output of the photocell corresponding to the four slots passed over by the cathode ray beam are shown in Figure 3E. The cathode ray beam passes over slots 1, 2, 3 and 4 in that order during the decay time of the sawtooth waveform. This action would result in a second series of four pulses appearing in the output of the photocell except for the application of a blanking signal from the timer 24 to a gate circuit 19 disposed between the photocell and the output terminal. The form of the gating signal is shown in Figure 3F. Alternatively, this gating signal could be applied to the control grid 15 of the cathode ray tube 10 to reduce the intensity of the cathode ray beam during the flyback time. This alternative connection is shown by the broken line 26 in Figure 1.

The sequence just described repeats for each cycle of the boxcar output, producing code groups of 6, 7, 6, 4 and 2 pulses, respectively, in the example chosen for Figure 3. It is seen that these numbers of pulses are the quantized levels of the input signal. The series of pulses may be counted by a series of flip-flop stages, not illustrated, giving the quantized level in binary form.

If spaced, flat-topped pulse signals are to be quantized, the sampler 21 and boxcar circuit 22 may be omitted and the pulse signal applied directly to the adding circuit shown in Figure 1. These pulse signals may also be employed as the timing wave for controlling the sequence of operation of other components of the system. The sawtooth generator 25 in this alternative system must generate a signal which has a time of fall less than the duration of the pulse to be coded in order that the cathode ray beam may be swept across the coding slots before the termination of the pulse. The operation of this modified system may be visualized by assuming that alternate cycles in each of the waveforms shown in Figure 3 are omitted and that the signals remain at zero amplitude level during this interval.

The system described is limited in its frequency response by the decay time of the phosphor on the cathode ray tube screen. Unless the light output of the phosphor decreases appreciably in the interval required for the cathode ray beam to pass from one slot to the next, the pulses in the various code groups will not be distinct but will be smeared together into a single output pulse for each cycle. This factor will limit the maximum sampling frequency that can be employed.

While I have illustrated and described a preferred embodiment of my invention, it is clear that modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. Apparatus for measuring the voltage amplitude of an electric signal comprising a cathode ray tube having vertical deflecting plates, an opaque mask having a plurality of horizontal translucent slots mounted on the face of said cathode ray tube, a photocell, said photocell being arranged and adapted to receive light impulses from the beam of said cathode ray tube through the slots of said mask, means for deflecting the beam of said cathode ray tube, and means for driving said beam back to its initial position at a constant rate across said slots to produce a series of light impulses at the photocell output, the number of light impulses being proportional to the amplitude of said electric signal.

2. Apparatus for measuring the voltage amplitude of an electric signal comprising a cathode ray tube, means for converting the signal to be measured to a rectangular wave form, means for deflecting the ray of said cathode ray tube from an initial position by an amount proportional to the amplitude of the converted signal, means for driving said ray back to the initial position at a constant rate, means for measuring return time of said deflected ray to the initial position.

3. A system for measuring the voltage amplitude of a signal comprising a cathode ray tube having deflecting plates for deflecting the beam of said tube in one direction, means for converting the signal to be measured to a signal having a rectangular wave form, means for impressing said converted signal on said deflecting plates of said cathode ray tube to deflect said beam an amount proportional to the amplitude of said signal, means impressed on said deflecting plates at the instant of maximum deflection of said beam for driving said beam back to its non-deflected position at a uniform rate, and means for measuring the duration of the return of said beam.

4. A system for measuring the voltage amplitude of an electric signal comprising a cathode ray tube having beam deflecting plates, an opaque mask having a plurality spaced parallel translucent slots therein mounted on the face of said cathode ray tube, a photocell arranged and adapted to receive light impulses from said cathode ray tube through the slots of said mask, means for converting the signal to be measured to a signal having a rectangular wave form, means for impressing said converted signal on the deflecting plates of said cathode ray tube to deflect the beam of said tube by an amount proportional to the voltage amplitude of said signal, means for blanking the output of said photocell during the deflection of said beam, and means impressed on the deflecting plates of said tube to drive said beam back to its non-deflected position at a constant rate.

5. The invention as defined in claim 4 wherein said means impressed on the deflecting plates of said tube to drive said beam back to its non-deflected position at a uniform rate comprises a generator having a sawtooth wave output.

6. A system for measuring the voltage amplitude of a signal comprising a cathode ray tube having beam deflecting plates, an opaque mask having a plurality of slots mounted on the face of said tube, a photocell pick-up adapted and arranged to receive light impulses from the beam of said tube through said plurality of slots, means for converting said signal to a rectangular wave, means for impressing said signal on said deflecting plates for initially deflecting said beam across said slots, a sawtooth wave generator, timing means for applying the output of said generator to said deflecting plates at the instant of maximum deflection of said beam for driving said beam back toward its non-deflected position at a constant rate.

7. The invention as defined in claim 6, and means for blanking the output of said photocell during the initial deflection of said beam.

8. A system for measuring the voltage amplitude of an electric signal comprising a cathode ray tube having deflecting plates, a mask having a plurality of slots mounted on the face of said tube, means for impressing said signal on said deflecting plates to deflect the beam of said tube across the slots of said mask, and photocell pick-up means for receiving the light impulses of said beam through said mask to produce an electrical output having pulses proportional in number to the amplitude of said signal.

9. A method for measuring the voltage amplitude of a signal comprising the steps of converting the wave shape of said signal to a rectangular wave form, applying said converted signal to the deflecting plates of a cathode ray tube to deflect the beam of said cathode ray tube by an amount proportional to the amplitude of said signal, driving said deflected beam back to its initial position by applying a sawtooth wave to said deflecting plates, and measuring the return time of said beam to its initial position.

10. A system for measuring the amplitude of an electric signal by producing pulses which are proportional in number to the magnitude of said signal comprising a cathode ray tube having an electron beam and beam deflecting plates, a face on said cathode ray tube, an opaque mask mounted on said face having a plurality of translucent openings, means coupled to said deflecting plates for periodically deflecting said beam by an amount which is proportional to an instantaneous magnitude of said electric signal, means coupled to said cathode ray tube for periodically intensifying said electron beam, second means coupled to said deflecting plates for causing said intensified beam to traverse a number of said translucent openings, said number being proportional to the magnitude of said electric signal, and means including a photoelectric cell positioned proximate to said cathode ray tube face to produce a pulse when each of said translucent openings is traversed by said intensified beam, the total number of said pulses thus produced being proportional to the magnitude of said electric signal.

11. A method of measuring the amplitude of an electric signal of variable amplitude comprising the steps of producing a plurality of consecutive first signals each of which has a magnitude differing from that of the first signal next preceding and of a value approximately proportional to an instantaneous magnitude of said electric signal, and producing a plurality of pulses from each of said first signals, the number of said pulses being proportional to the magnitude of said first signals whereby the number of said pulses provides a measurement of the magnitude of said electric signal.

12. A system for measuring the instantaneous amplitude of an electric signal of variable magnitude by producing pulses which are proportional in number to the instantaneous amplitude of said electric signal comprising first means for periodically producing consecutive sample signals which are proportional in magnitude to the instantaneous amplitude of said electric signal, and pulse producing means coupled to said first means for producing pulses which are proportional in number to the magnitude of each of said consecutive sample signals, said number of pulses thereby being a measurement of the quantized instantaneous amplitude of said electric signal.

References Cited in the file of this patent

UNITED STATES PATENTS

| | | |
|---|---|---|
| 2,214,019 | Gray | Sept. 10, 1940 |
| 2,357,922 | Ziebolz et al. | Sept. 12, 1944 |
| 2,402,058 | Loughren | June 11, 1946 |
| 2,415,190 | Rajchman | Feb. 4, 1947 |
| 2,415,191 | Rajchman | Feb. 4, 1947 |
| 2,489,883 | Hecht | Nov. 29, 1949 |
| 2,528,020 | Sunstein | Oct. 31, 1950 |
| 2,540,016 | Sunstein | Jan. 30, 1951 |
| 2,605,332 | Parsons | July 29, 1952 |
| 2,613,273 | Kalfaian | Oct. 7, 1952 |
| 2,659,072 | Coales et al. | Nov. 10, 1953 |